United States Patent [19]

Clegg et al.

[11] 4,137,376

[45] Jan. 30, 1979

[54] SODIUM SULPHUR BATTERIES COMPRISING A PLURALITY OF SEPARATE CELLS WITHIN A CONTAINER

[75] Inventors: Gordon A. Clegg, Rossendale; David R. Lauder, Timperley, both of England

[73] Assignee: Chloride Silent Power Limited, London, England

[21] Appl. No.: 847,287

[22] Filed: Oct. 31, 1977

[30] Foreign Application Priority Data

Nov. 8, 1976 [GB] United Kingdom ............... 46471/76

[51] Int. Cl.$^2$ ............................................. H01M 10/39
[52] U.S. Cl. ..................................... 429/104; 429/159
[58] Field of Search ................. 429/104, 159, 156, 163

[56] References Cited

U.S. PATENT DOCUMENTS

| | | | |
|---|---|---|---|
| 2,416,079 | 2/1947 | Anthony | 429/159 |
| 3,314,823 | 4/1967 | Balaguer | 429/159 |
| 3,784,411 | 1/1974 | Ciliberty, Jr. | 429/159 X |
| 4,041,216 | 8/1977 | Desplanches et al. | 429/104 |
| 4,066,826 | 1/1978 | Jones et al. | 429/104 |

*Primary Examiner*—Anthony Skapars
*Attorney, Agent, or Firm*—Beveridge, DeGrandi, Kline & Lunsford

[57] ABSTRACT

A battery formed of sodium sulphur cells has each cell coated with an intumescent paint which is heated to produce a carbonaceous foam. This foam fills an outer housing around the cells or a separate containment around each cell and serves to confine material that might leak out of any damaged cell.

17 Claims, 2 Drawing Figures

SODIUM SULPHUR BATTERIES COMPRISING A PLURALITY OF SEPARATE CELLS WITHIN A CONTAINER

BACKGROUND OF THE INVENTION

This invention relates to sodium sulphur batteries comprising a plurality of separate cells within a container.

A sodium sulphur cell has a solid electrolyte, typically sodium beta alumina, which separates molten sodium from a cathodic reactant comprising liquid sulphur/polysulphides. In the event of the electrolyte material cracking, the sodium and sulphur will meet causing a vigorous chemical reaction. The hot polysulphide material and sodium together are extremely corrosive and will attack stainless steel. Failure of one cell in a sodium sulphur battery can lead to a leakage of this highly corrosive polysulphide material and this in turn can lead to the attack on the casing of other cells so propagating the failure throughout the entire battery.

Various safety precautions are taken to prevent or minimise any such risk. In particular, provision may be made for restricting the flow of the materials in each cell and coatings may be provided on the inner surface of the outer container of each cell to minimise or prevent any risk of corrosion of the material of the cell container.

SUMMARY OF THE INVENTION

It is an object of the present invention however to provide yet further safety precautions against risk of a failure of one cell leading to the attack on the containers of other cells.

According to this invention, in a sodium sulphur battery comprising a plurality of cells each having a container within which is a solid electrolyte separating sodium from a cathodic reactant, the cells are formed into an assembly within an outer housing and foamed carbon material is provided within the outer housing between the cells.

The foamed carbon material may be formed by putting a polyurethane foam in the housing between the cells and then carbonising the foam. The foam is preferably a substantially closed pore foam.

Preferably the foamed carbon material is constituted by an intumescent paint which is applied to and dried upon the outside of the individual cell tubes prior to assembly of the battery and, after the battery has been assembled, the assembly is heated to the temperature necessary to cause the intumescent paint to foam. The foam will fill the available free space within the battery with a carbon matrix. An inpermeable sheet, e.g. of metal foil, may be provided around each cell so that the foam expands to fill the region inside the sheet material. The carbon material is thus subdivided into separate layers around each cell. This permits the cells to be constructed individually if so desired and provided each with its carbon matrix before assembly into a battery.

With the above-described construction, in the event of a cell failure, the foam confines any material that leaks from a cell and hence allows continued safe operation of the remaining cells. Such a foam is conveniently produced by intumescence of a carbonaceous material; intumescent paints are commercially available and substantially all of them provide a carbonaceous foam.

The invention furthermore includes within its scope a method of making a sodium sulphur battery comprising a plurality of sodium sulphur cells within an outer housing wherein, after assembly of the cells in the housing, a polyurethane foam is formed around the cells within the housing and this foam is subsequently carbonised. As indicated above a substantially closed pore foam is preferably used.

In a preferred form, however, the invention includes a method of making a sodium sulphur battery comprising a plurality of sodium sulphur cells with an outer housing wherein each cell, before assembly into the battery, is coated with an intumescent paint of the kind providing a carbonaceous foam. After assembly of the cells into the housing, the battery may be heated to a temperature such that the paint foams to fill the free space within the battery with a carbon matrix. Alternatively each cell may be provided with an outer containment, e.g. a rigid impermeable sheet, and the intumescent paint is heated, either before or after assembly of the cells into a battery so that the paint foams to fill the containment around each cell.

The individual cells may each comprise a stainless steel or aluminium or carbon steel container for the electrolyte and the anodic and cathodic reactants. Preferably this container is of tubular form and within the container is a tube of solid electrolyte material which separates the liquid sodium from the liquid sulphur/polysulphides forming the cathodic reactant. Preferably the sodium is on the outer side of the electrolyte tube and the sulphur/polysulphides on the inner side; in this case the cell container has normally to withstand contact only with molten sodium. A number of such cells may be assembled together, conveniently with their axes parallel, in an outer housing, the space between the cells being filled with the carbon matrix by painting the cells with the intumescent paint and causing the paint to foam as previously described.

Many forms of intumescent paint which are suitable for this purpose are well-known and commercially available. Reference may be made to the article by H. L. Vandersall entitled "Intumescent Coating Systems, their Development and Chemistry" (University of Utah, Polymer Conference Series June 15–20, 1970) which discusses many compositions of intumescent paint. Substantially all commercially available intumescent paints provide a substantially carbonaceous foam on heating. Such paints nowadays typically contain an inorganic acid or material yielding acid when heated, a polyhydric material rich in carbon, an organic amine or amide and a halogenated material. Two or more functional groupings may be included in a single component. The acid is commonly a phosphate or other phosphorous-containing compound which will yield phosphoric acid on heating. The polyhydric material may be starch or other naturally-occurring materials such as linseed oil. The amine or amide may be a material such as urea melamine or other nitrogen-containing compounds such as are known as blowing agents. The decomposition temperatures of such material typically lie in the range of 130 to 350° C. and hence no problems arise in heating the cell since a sodium sulphur battery typically works at a temperature of the order of 350° C.

As indicated above, many such intumescent paints are available commercially. The essential feature of all these paints is that when they are heated to the appropriate "trigger" temperature they foam and produce a carbonaceous matrix. It is this carbonaceous matrix which is utilised in the present invention to fill the space between the individual cells of the sodium sulphur battery to restrict any leakage of liquid material from any faulty cell.

DESCRIPTION OF THE PREFERRED EMBODIMENTS

Figure 1:
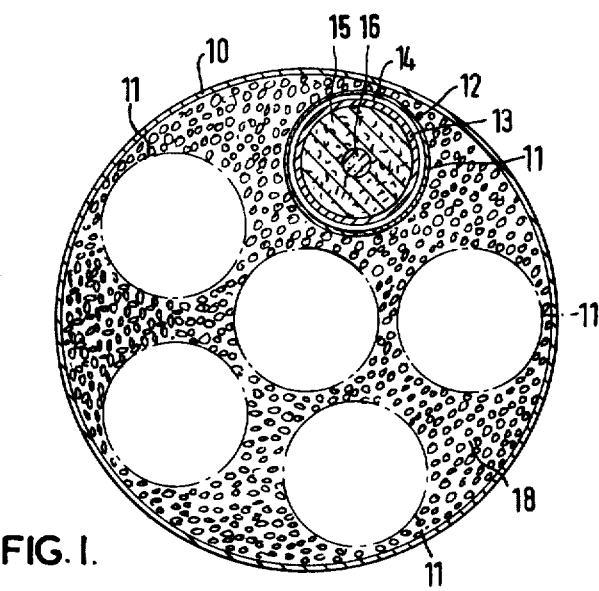
FIGS. 1 and 2 are each a diagrammatic cross-section through a sodium sulphur battery constituting an embodiment of the invention.

Referring to FIG. 1 of the drawings, the battery comprises an outer steel housing 10 containing a number of individual sodium sulphur cells 11. Each cell 11 comprises a tube 12 of mild steel containing a beta alumina electrolyte tube 13 separating sodium 14 from a cathodic reactant 15. The sodium lies in a capillary region between the electrolyte tube 13 and the inner wall of the steel tube 12. The cathodic reactant comprises sulphur and sodium/polysulphides and is contained in an electronically-conductive matrix, typically a graphite felt matrix, within the electrolyte tube 13. A central cathode current collector 16 of electronically-conductive material extends axially through the cell and extends outwardly through an insulating bush (not shown) in an end wall of the outer housing 10. This current collector 16 may be formed of a material which is chemically inert to the cathodic reactant (e.g. carbon) or may be a metal, e.g. aluminium, coated with an electronically-conductive protective coating. For simplicity in the drawing, details of the inner construction of the cells 11 is shown only for one of the cells. The steel tubes 12 constitute the anode current collectors for each cell.

The present invention is concerned more particularly with the region between the cells 11 inside the outer housing 10. Each of the tubes 12, after the cells have been completed but before assembly in the battery, is painted with an intumescent paint which gives a carbonaceous foam on heating. In this particular example, the tubes were coated with an epoxy based intumescent paint, Chartex 59 supplied by Avco Systems Division (U.S.A.). The tubes after painting were assembled together in the container 10. The assembly was heated to a temperature just above the trigger temperature (285° C.) of this paint and then allowed to cool. On examination it was found that the whole of the space 18 between the cells 11 within the container 10 was filled with a carbon foam of relatively high density and strength. This foam had no detectable electrical conductivity.

Instead of using an intumescent paint, alternatively, the space between the cells, after they are assembled in the battery housing, may be filled with a polyurethane foam, e.g. "Brown Polyurethane Foam" sold by Strand Glass Co. Ltd; the foam, after it is formed, being carbonised by heating the battery to an appropriate temperature. Preferably a closed cell foam is employed to minimise any possibility of leakage through the foam in the event of a failure of a cell.

Figure 2:
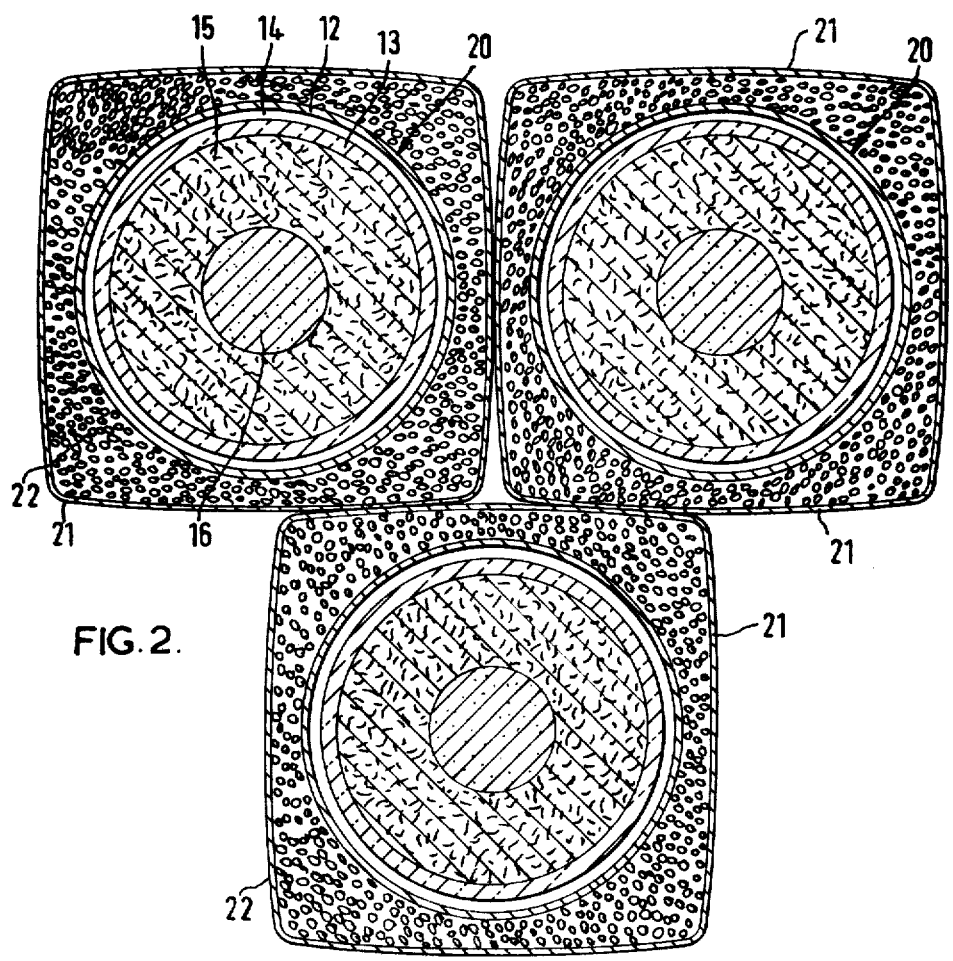

FIG. 2 (in which the same reference numerals are used as in FIG. 1 to indicate correspondent features) illustrates another embodiment of the invention in which each individual cell 20 is surrounded by an impermeable sheet 21, preferably of rigid material, e.g. of aluminium, so that the intumescent paint, which as before is put on the outside of the cell, when it foams, fills the containment constituted by the sheet 21 with a carbonaceous foam 22. This containment permits foaming of the paint by heating either before or after the individual cells are assembled into an outer housing to form a battery. As shown, it is convenient to make the foam 22 take up a form which is substantially square in cross-section, so that the individual cells of a battery may be arranged in straight lines. The cells in adjacent lines may be staggered as shown or arranged in other arrays.

Although the embodiments described above make use of central sulphur cells, i.e. cells in which the sulphur electrode is inside the electrolyte tube and the sodium is outside the electrolyte, the invention may be applied also to central sodium cells in which the sodium is inside the electrolyte tube and the sulphur electrode is around the outside of the electrolyte tube. In each case, in the event of a failure of one cell in a battery, the carbonaceous foam will absorb leakage and so will reduce or eliminate risk of the failure propagating through the battery to other cells.

We claim:

1. A sodium sulphur battery comprising a plurality of cells each having a container within which is a solid electrolyte separating sodium from a cathodic reactant, wherein the cells are formed into an assembly within an outer housing and wherein foamed carbon material is provided within the outer housing between the cells.

2. A sodium sulphur battery as claimed in claim 1 wherein the foamed carbon material is a substantially closed pore foam.

3. A sodium sulphur battery as claimed in claim 1 wherein the foamed carbon material is a carbonised polyurethane foam.

4. A sodium sulphur battery as claimed in claim 1 wherein the foamed carbon material is constituted by an intumescent paint applied to and dried upon the outside of the individual cell tubes prior to assembly of the battery and which has been caused to foam by heating after the battery has been assembled.

5. A sodium sulphur battery as claimed in claim 1 and comprising a plurality of sodium sulphur cells each having an outer metal casing of tubular form, the cells being assembled together in said outer housing with their axes parallel, the space between the cells being filled with the foamed carbon material.

6. A sodium sulphur battery as claimed in claim 1 and having, for each cell, an impermeable sheet forming a containment around each cell for the foamed carbon material.

7. A sodium sulphur battery as claimed in claim 6 wherein said impermeable sheet is a rigid sheet.

8. A sodium sulphur battery as claimed in claim 4 wherein the foamed intumescent material fills the outer housing around the cells.

9. A sodium sulphur battery as claimed in claim 4 and having a containment around each cell, which containments are each filled with the foamed intumescent material.

10. A sodium sulphur battery comprising a plurality of cells each having a container within which is a solid electrolyte separating sodium from a cathodic reactant, wherein the cells are formed into an assembly and wherein foamed carbon material is provided between the cells.

11. A sodium sulphur battery as claimed in claim 10 wherein the foamed carbon material is a substantially closed pore foam.

12. A sodium sulphur battery as claimed in claim 10 wherein the foamed carbon material is a carbonized polyurethane foam.

13. A sodium sulphur battery as claimed in claim 10 wherein the foamed carbon material is constituted by an intumescent paint applied to and dried upon the outside of the individual cell tubes prior to assembly of the battery and which has been caused to foam by heating after the battery has been assembled.

14. A cell for a sodium sulphur battery comprising:
an outer housing,
a container within said outer housing,
within said container, a solid electrolyte separating sodium from a cathodic reactant, and
foamed carbon material between said outer housing and said container.

15. A cell as claimed in claim 14 wherein the foamed carbon material is a substantially closed pore foam.

16. A cell as claimed in claim 14 wherein the foamed carbon material is a carbonized polyurethane foam.

17. A cell as claimed in claim 14 wherein the foamed carbon material is constituted by an intumescent paint applied to and dried upon said container prior to installation within said outer housing and which has been caused to foam by heating after said cell is assembled.

* * * * *